(12) United States Patent
Lim et al.

(10) Patent No.: US 9,992,615 B2
(45) Date of Patent: Jun. 5, 2018

(54) METHOD AND APPARATUS FOR CONTROLLING A DEVICE USING BLUETOOTH TECHNOLOGY

(71) Applicant: LG ELECTRONICS INC., Seoul (KR)

(72) Inventors: Jinkwon Lim, Seoul (KR); Jingu Choi, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/406,137

(22) Filed: Jan. 13, 2017

(65) Prior Publication Data

US 2017/0208428 A1   Jul. 20, 2017

Related U.S. Application Data

(60) Provisional application No. 62/278,944, filed on Jan. 14, 2016.

(51) Int. Cl.
*H04B 7/00* (2006.01)
*H04W 4/00* (2018.01)
*H04W 76/02* (2009.01)
*H04W 12/06* (2009.01)

(52) U.S. Cl.
CPC .......... *H04W 4/008* (2013.01); *H04W 12/06* (2013.01); *H04W 76/023* (2013.01)

(58) Field of Classification Search
CPC .... H04W 4/008; H04W 12/06; H04W 76/023
USPC ....................................... 455/41.2
See application file for complete search history.

(56) References Cited

U.S. PATENT DOCUMENTS

| | | | | |
|---|---|---|---|---|
| 2005/0266798 A1* | 12/2005 | Moloney | ............. | H04L 63/0435 455/41.2 |
| 2006/0135065 A1* | 6/2006 | Lee | ........................ | H04W 12/04 455/41.1 |
| 2007/0202807 A1* | 8/2007 | Kim | ..................... | H04B 5/0062 455/41.2 |
| 2015/0147970 A1* | 5/2015 | Tan | ........................ | H04W 12/08 455/41.2 |

* cited by examiner

*Primary Examiner* — Ayodeji Ayotunde
(74) *Attorney, Agent, or Firm* — Birch, Stewart, Kolasch & Birch, LLP

(57) ABSTRACT

Disclosed is a method for connecting, by a first device, with a second device using Bluetooth communication. The method includes transmitting a request message to request user information for identifying a user of the second device to the second device, receiving a response message including the user information from the second device, registering the second device to a first authority policy or a second authority policy based on the user information, and establishing a Bluetooth connection with the second device registered to the first authority policy or the second authority policy. The first authority policy indicates a first control authority for controlling an operation of the first device, the second authority policy indicates a second control authority for controlling an operation of the first device, the first control authority indicates a control authority capable of controlling an operation of the first device within a limited range, the second control authority indicates a control authority capable of controlling all of operations of the first device.

10 Claims, 18 Drawing Sheets

[Fig.1]
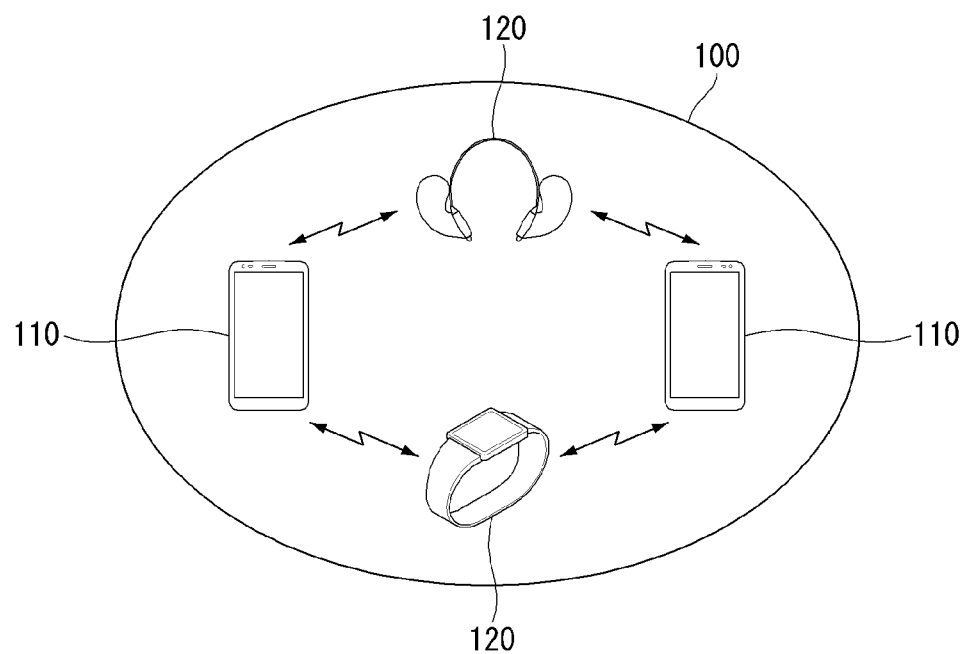

[Fig.2]
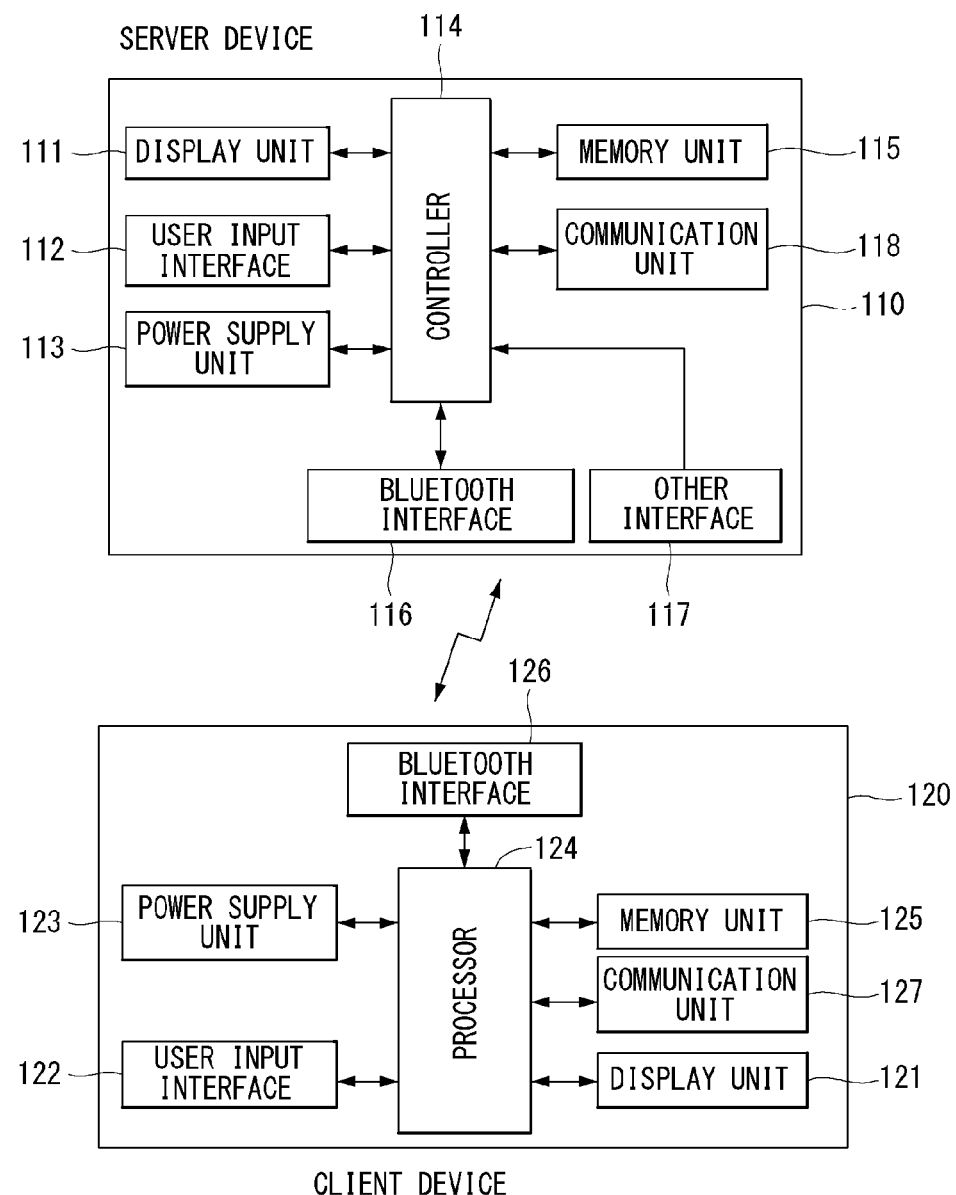

[Fig.3]
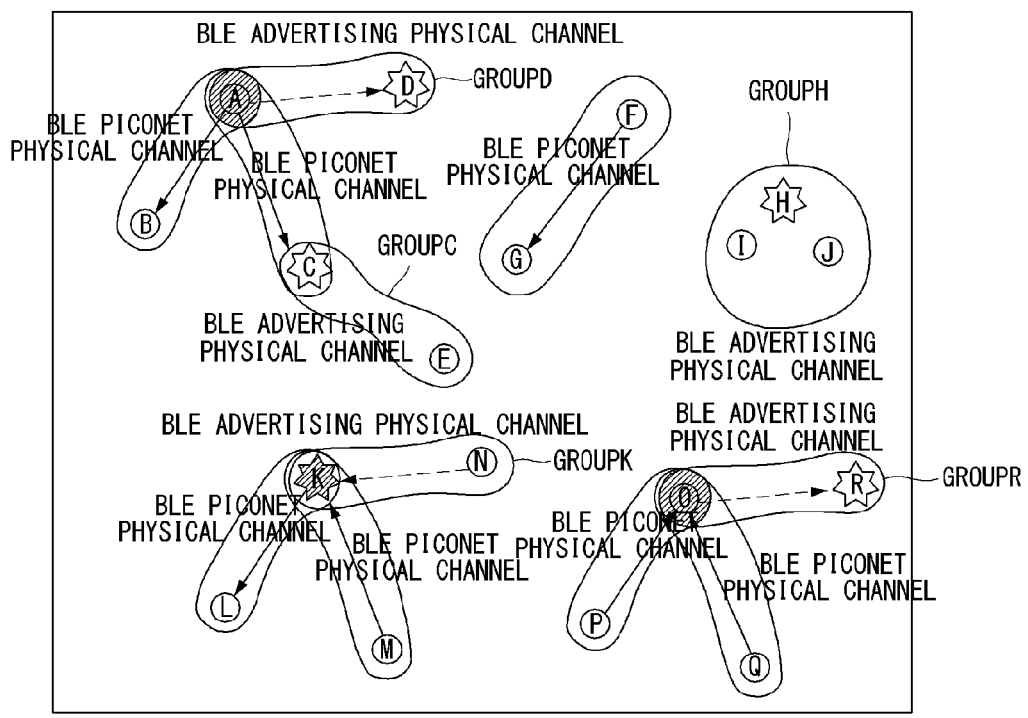

[Fig.4]
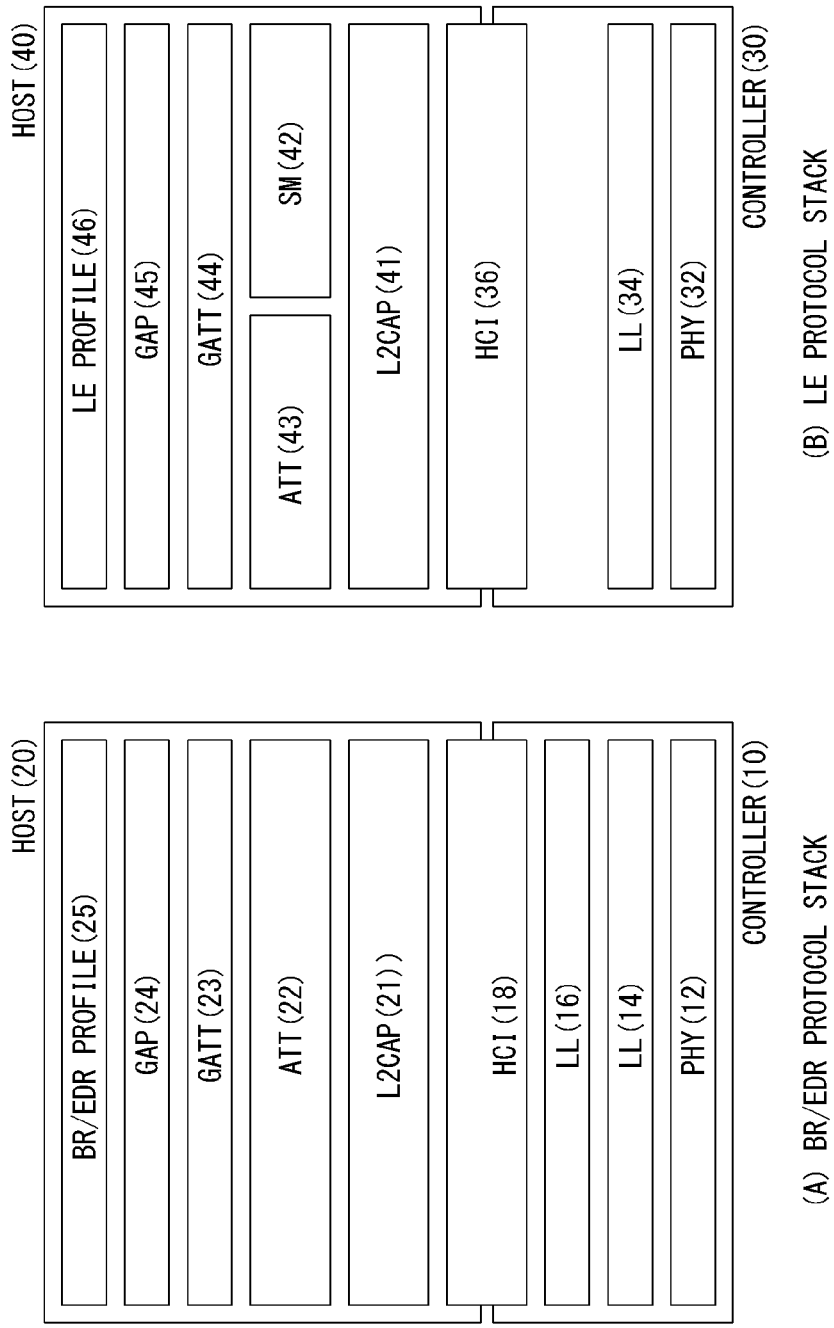

[Fig.5]
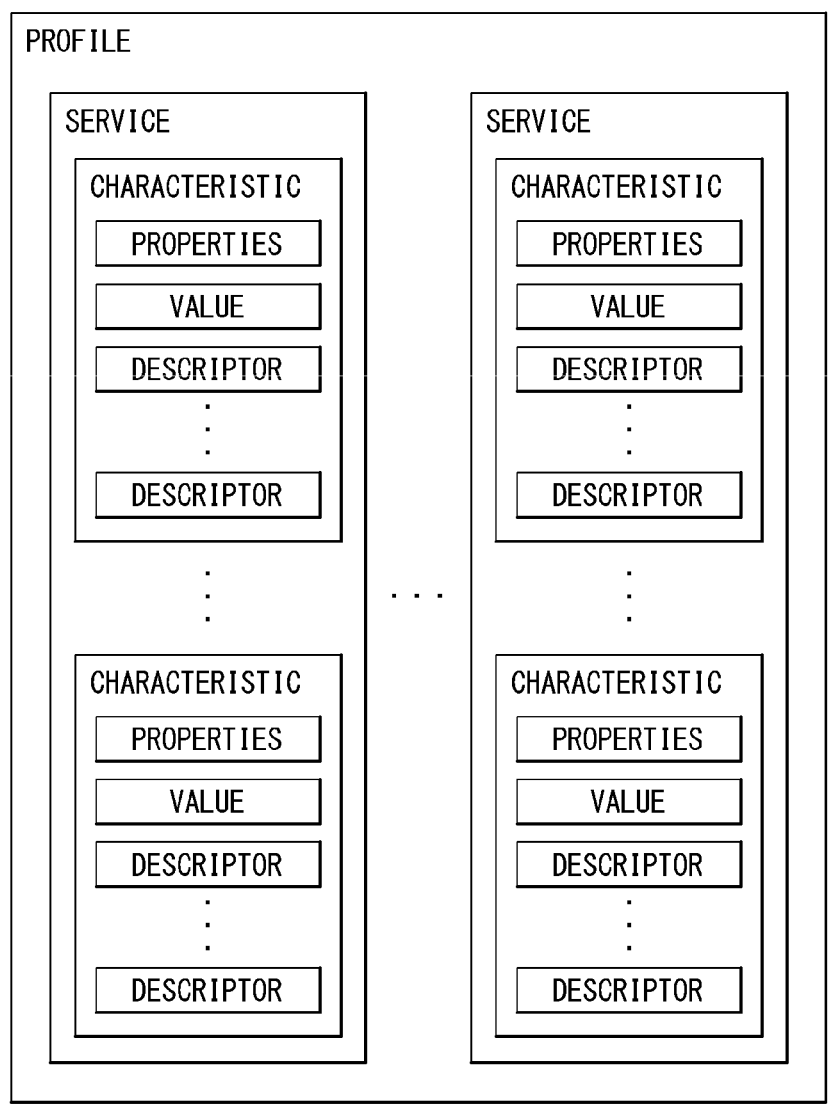

[Fig.6]
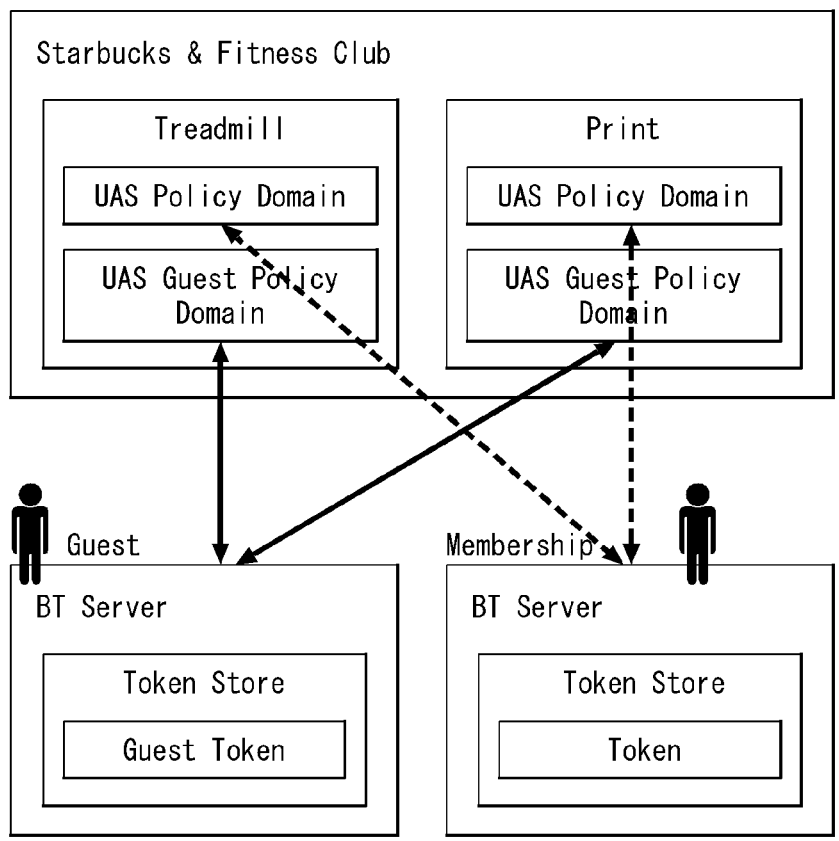

[Fig.7]
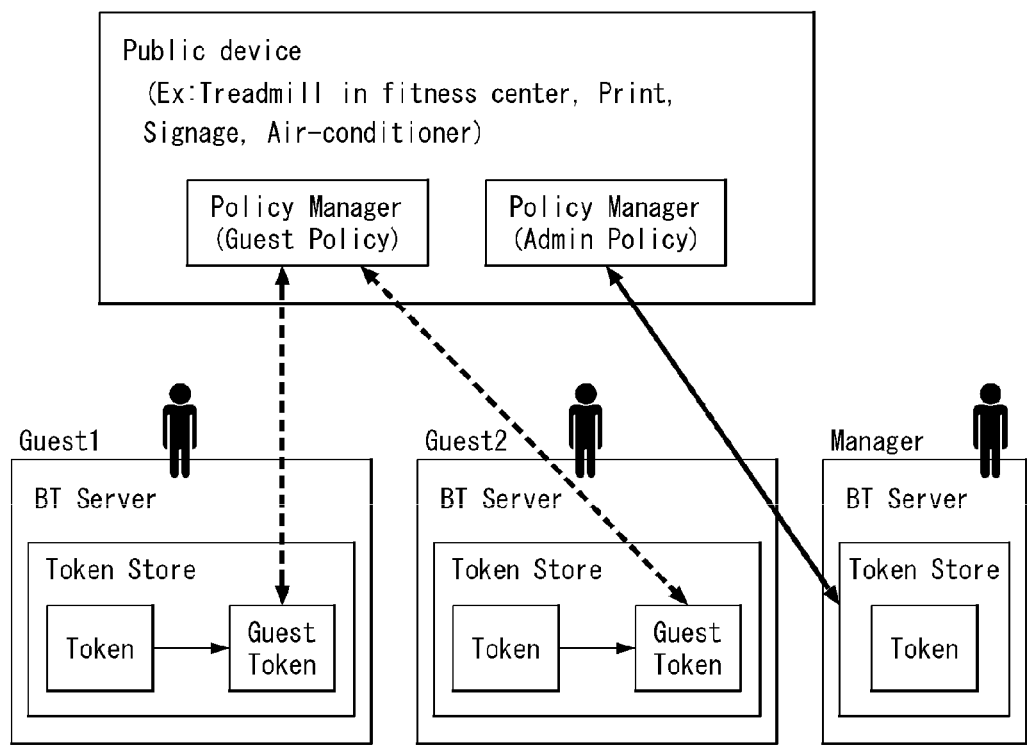

[Fig.8]
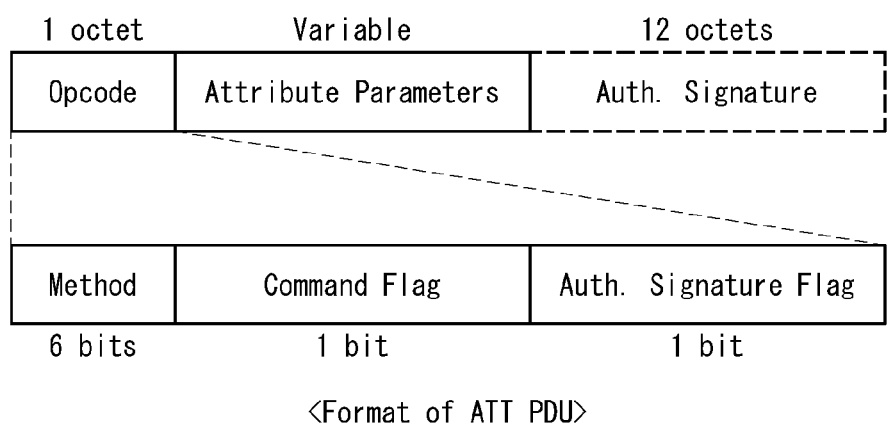
<Format of ATT PDU>

[Fig.9]
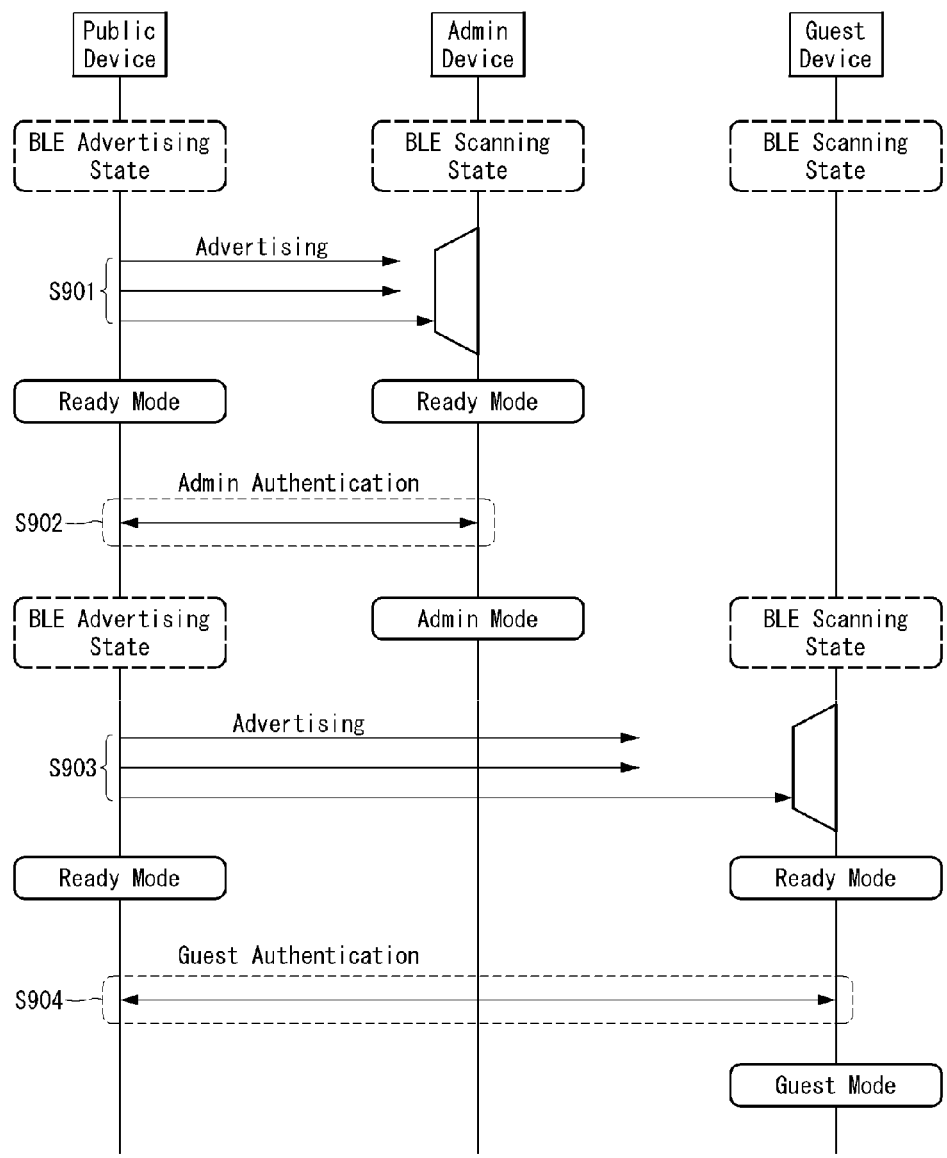

[Fig.10]
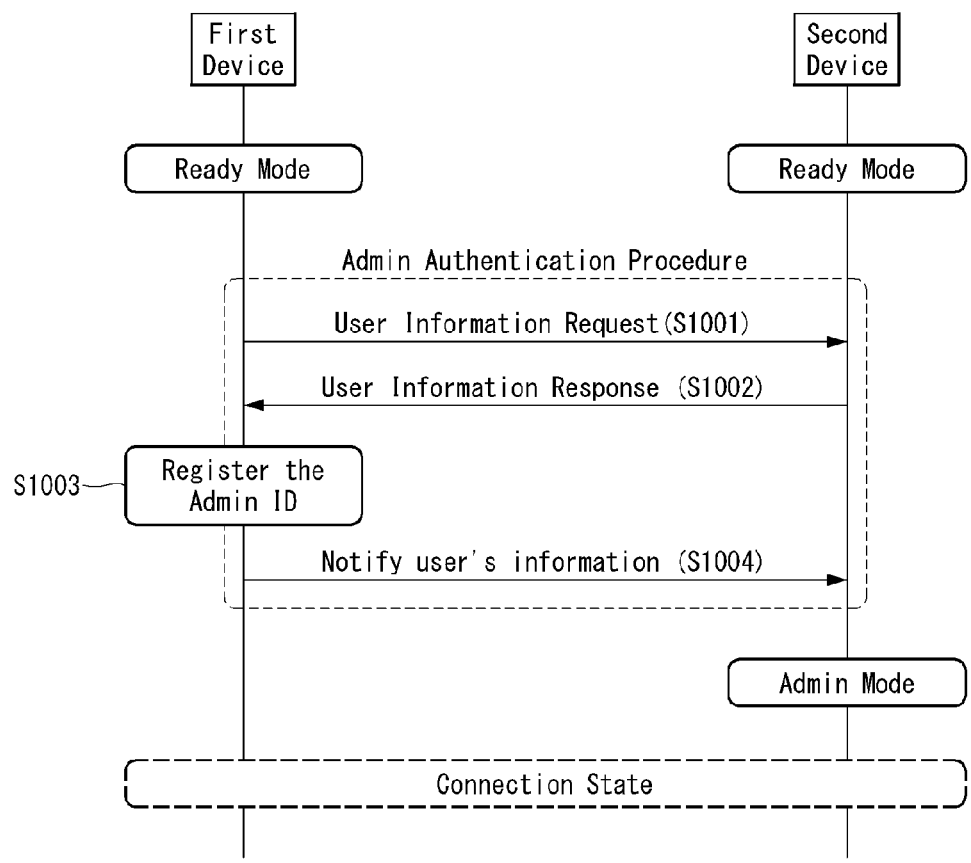

[Fig.11]
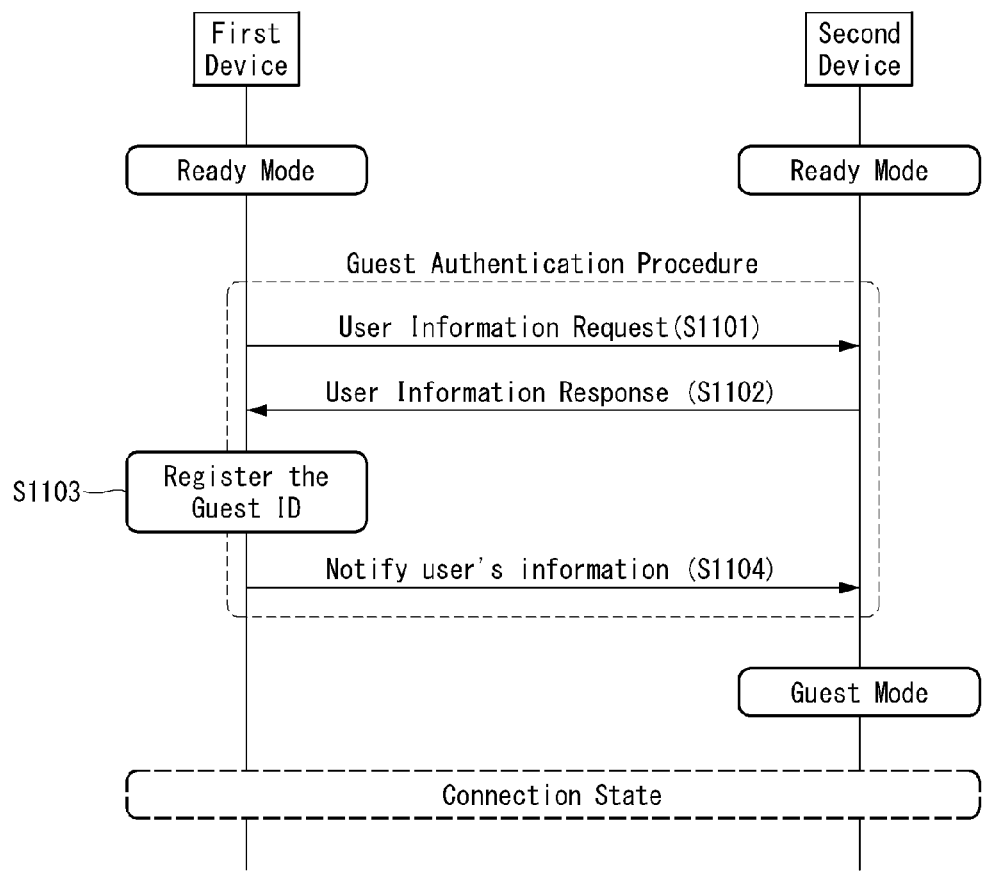

[Fig.12]
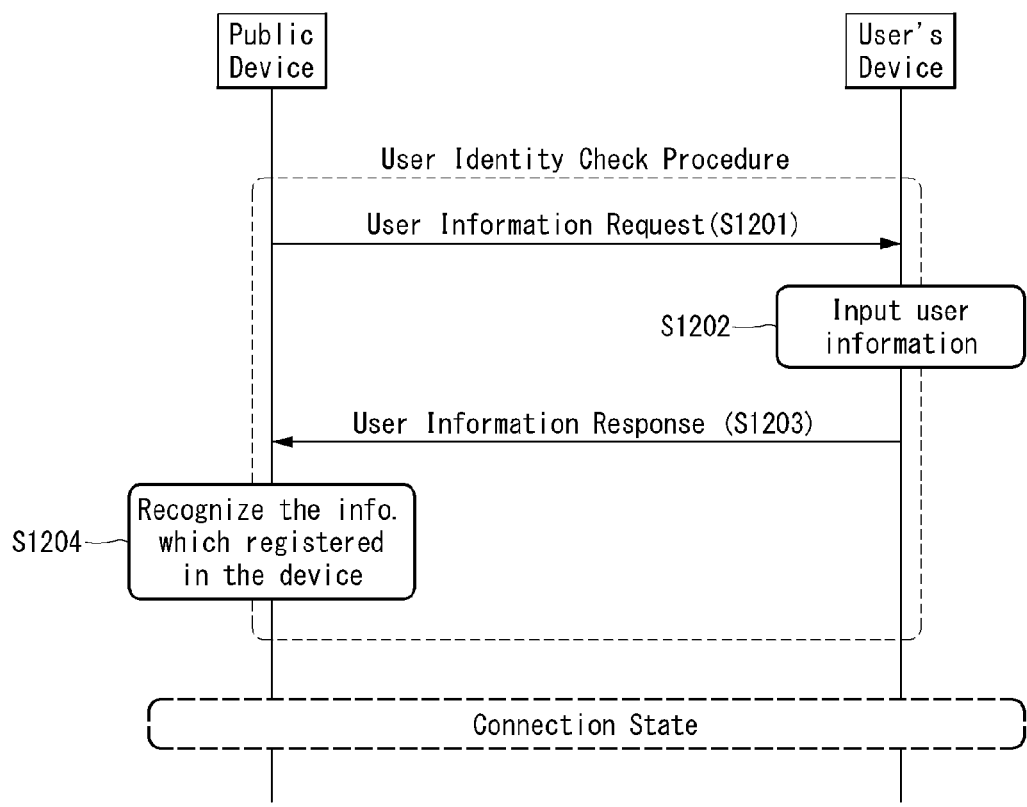

[Fig.13]
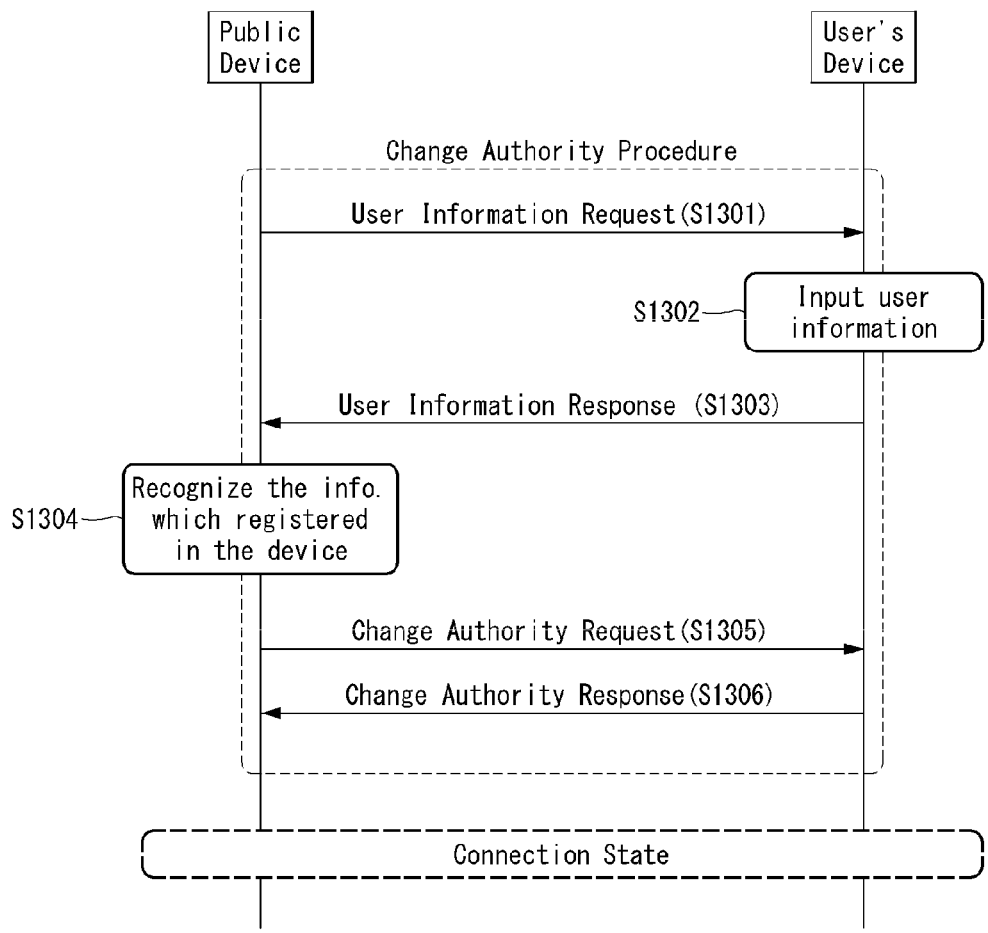

[Fig.14]
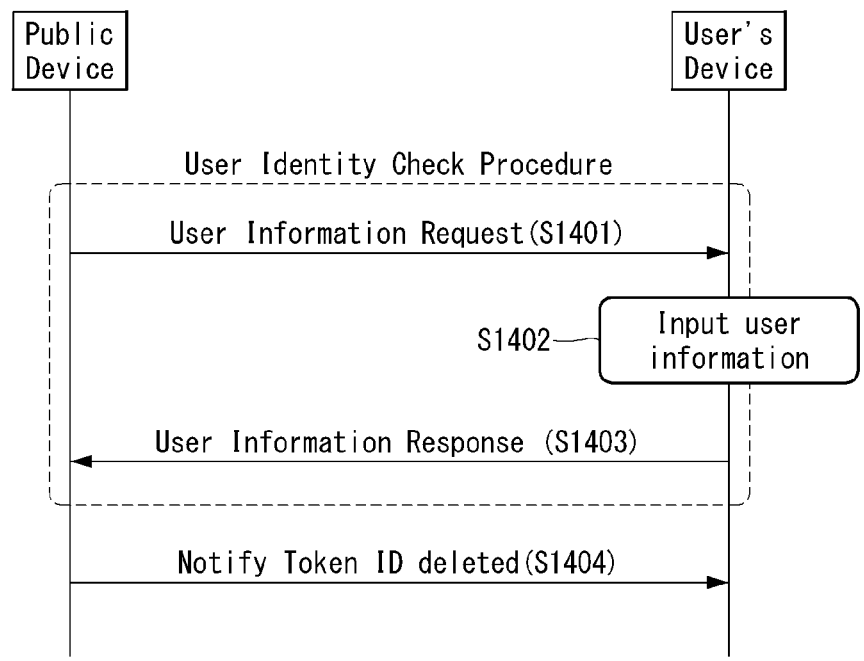

[Fig.15]
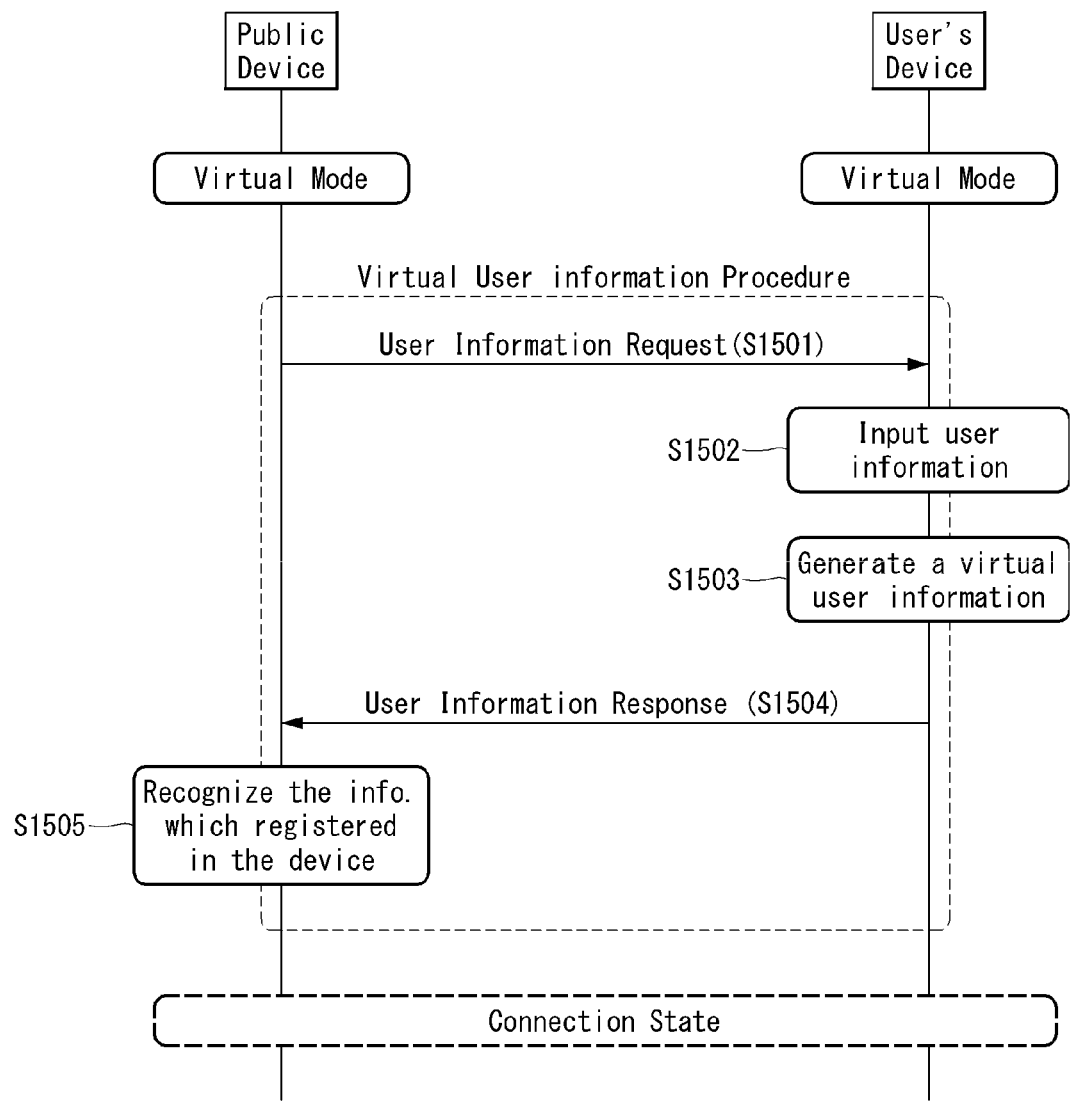

[Fig.16]
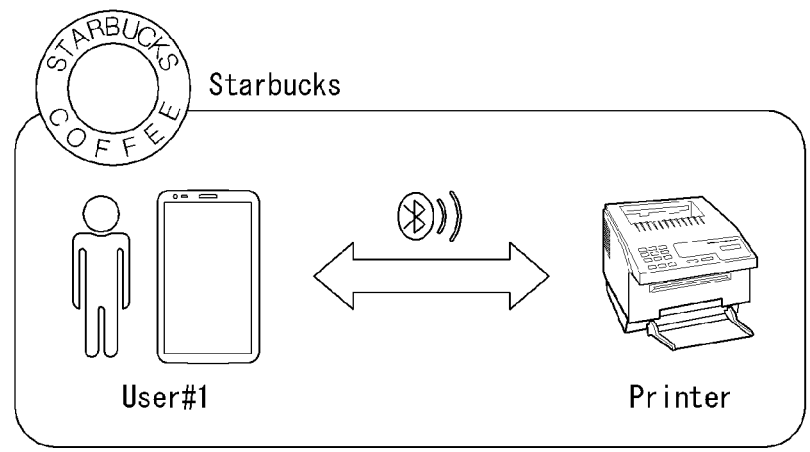

[Fig.17]
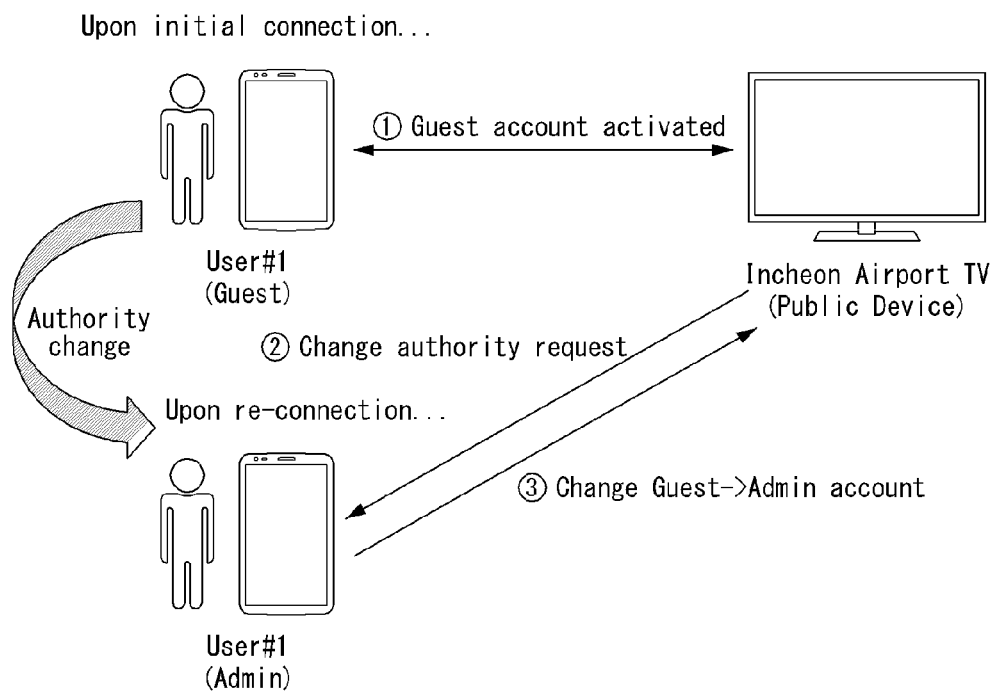

[Fig.18]
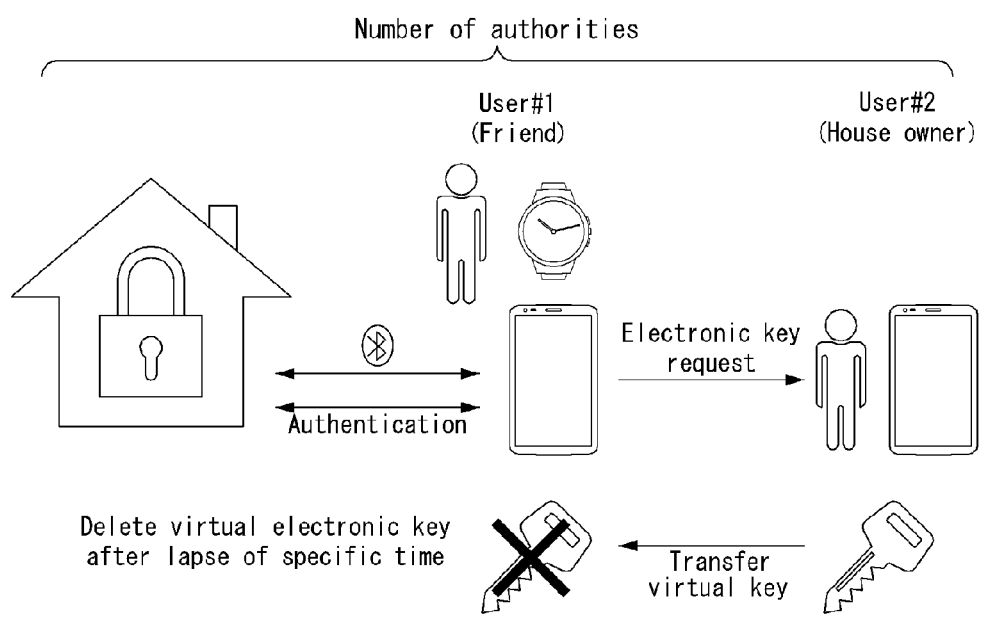

METHOD AND APPARATUS FOR CONTROLLING A DEVICE USING BLUETOOTH TECHNOLOGY

CROSS-REFERENCE TO RELATED APPLICATION

This application priority to Provisional Application No. 62/278,944 filed on 14 Jan. 2016 in U.S.A. the entire contents of which are hereby incorporated by reference in its entirety

BACKGROUND OF THE INVENTION

Field of the Invention

The present invention relates to a method and apparatus for connecting devices using Bluetooth, that is, a short-distance technology, in a wireless communication system and, more particularly, to a method and apparatus for establishing a connection between devices using a Bluetooth technology.

Discussion of the Related Art

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF THE INVENTION

An object of the present invention is to provide a method and apparatus for establishing a connection between devices using a Bluetooth low energy (LE) technology.

Furthermore, an object of the present invention is to provide a method for performing authentication using Bluetooth for a connection between devices.

Furthermore, an object of the present invention is to provide a method for setting different authorities depending on Admin authentication or guest authentication.

Furthermore, an object of the present invention is to provide a method for establishing a connection between devices by confirming user information in the case of a registered device.

Furthermore, an object of the present invention is to provide a method for generating virtual user information and connecting to a device using the generated virtual user information.

Technical objects to be achieved by the present invention are not limited to the aforementioned objects, and those skilled in the art to which the present invention pertains may evidently understand other technological objects from the following description.

An aspect of the present invention provides a method for connecting, by a first device, to a second device using a Bluetooth technology.

More specifically, an aspect of the present invention provides a method for connecting, by a first device, with a second device using Bluetooth communication, including transmitting a request message to request user information for identifying a user of the second device to the second device, receiving a response message including the user information from the second device, registering the second device to a first authority policy or a second authority policy based on the user information, and establishing a Bluetooth connection with the second device registered to the first authority policy or the second authority policy. The first authority policy may indicate a first control authority for controlling an operation of the first device, the second authority policy may indicate a second control authority for controlling an operation of the first device, the first control authority may indicate a control authority capable of controlling an operation of the first device within a limited range, and the second control authority may indicate a control authority capable of controlling all of operations of the first device.

Another aspect of the present invention provides a first device for connecting with a second device using Bluetooth communication, including a communication unit configured to communicate with the outside in a wired or wireless manner and a processor functionally connected to the communication unit. The processor is configured to transmit a request message to request user information for identifying a user of the second device to the second device, receive a response message including the user information from the second device, register the second device to a first authority policy or a second authority policy based on the user information, and establish a Bluetooth connection with the second device registered to the first authority policy or the second authority policy. The first authority policy may indicate a first control authority for controlling an operation of the first device, the second authority policy may indicate a second control authority for controlling an operation of the first device, the first control authority may indicate a control authority capable of controlling an operation of the first device within a limited range, and the second control authority may indicate a control authority capable of controlling all of operations of the first device.

The method may further include transmitting a notification message including an identifier (ID) indicating that the second device has been registered to the first authority policy or the second authority policy and service information indicating services available for the second device according to the registered authority policy.

The user information may be input to the second device using at least one of a fingerprint, iris, password, and pattern of the user.

The response message may include a token value indicative of the user.

The user information included in the response message may be encrypted virtual user information.

Registering the second device may include checking whether the second device is a previously registered device and registering the second device to the first authority policy or the second authority policy when the second device is not a previously registered device.

The method may further transmitting sending a notification message indicating that information about the second device has been deleted when the second device information registered to the first authority policy or the second authority policy has been deleted.

The method may further include transmitting a change request message for changing an authority policy to which the second device has been registered to the second device, receiving a change response message indicating the approval of the change as a response to the change request message from the second device, and changing the authority policy to which the second device has been registered.

Changing the authority policy may include registering the second device to the second authority policy when the second device has been registered to the first authority policy.

Changing the authority policy may include registering the second device to the first authority policy when the second device has been registered to the second authority policy.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic view illustrating an example of a wireless communication system using a Bluetooth low energy technology to which the present invention is applicable.

FIG. 2 is an internal block diagram of an example of devices to which the present invention is applicable.

FIG. 3 is a view illustrating an example of a Bluetooth low energy topology.

FIG. 4 is a view illustrating an example of a Bluetooth communication architecture to which the present invention is applicable.

FIG. 5 is a view illustrating an example of a structure of a generic attribute profile (GATT) of Bluetooth low energy.

FIG. 6 is a diagram showing an example of a method for authenticating a guest of a public device to which an embodiment of the present invention may be applied.

FIG. 7 is a diagram showing an example of a method for authenticating a guest of a public device to which an embodiment of the present invention may be applied.

FIG. 8 is a diagram illustrating the data format of an attribute protocol to which an embodiment of the present invention may be applied.

FIG. 9 is an embodiment to which the present invention may be applied and is a diagram showing a method for authenticating, by a public device, a device.

FIG. 10 is an embodiment to which the present invention may be applied and is a diagram showing an Admin authentication method.

FIG. 11 is an embodiment to which the present invention may be applied and is a diagram showing a guest authentication method.

FIG. 12 is an embodiment to which the present invention may be applied and is a diagram showing a method for connecting to a previously registered user device.

FIG. 13 is an embodiment to which the present invention may be applied and is a diagram showing a method for changing the authority of a previously registered user device.

FIG. 14 is an embodiment to which the present invention may be applied and is a diagram showing a method for connecting to a previously registered user device.

FIG. 15 is an embodiment to which the present invention may be applied and is a diagram showing a method for establishing a connection between devices using virtual user information.

FIG. 16 is an embodiment to which the present invention may be applied and is a diagram showing a method for establishing a Bluetooth connection with a public device through an authentication procedure.

FIG. 17 is an embodiment to which the present invention may be applied and is a diagram showing a method for changing the authority of a previously registered user device.

FIG. 18 is an embodiment to which the present invention may be applied and is a diagram showing a method for recovering the authority of a previously registered user device.

DETAILED DESCRIPTION OF THE EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, a plurality of devices measuring exercising activities of human beings through a fitness equipment using a specific device have been presented, but a device transmitting measured exercising data through Bluetooth to show specific numerical values to users has not been introduced yet.

Thus, the present invention proposes a method for measuring human beings' exercising activities through the fitness equipment and transmitting and processing measured data through Bluetooth LE to provide the processed data to users.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate.

The user input interfaces 112 and 122 refer to modules providing a user input such as a screen button to the controllers to enable the user to control an operation of the devices.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.
 1. Device D is an advertiser and device A is an initiator (group D).
 2. Device E is a scanner and Device C is an advertiser (group C).
 3. Device H is an advertiser, and devices I and J are scanners (group H).
 4. Device K is also an advertiser, and device N is an initiator (group K).
 5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 is a view illustrating an example of a Bluetooth communication architecture to which the present invention is applicable.

Referring to FIG. 4, (a) of FIG. 4 illustrates an example of a protocol stack of a Bluetooth basic rate (BR/enhanced data rate (EDR) that supports GATT (Generic Attribute Profile), and (b) of FIG. 4 illustrates an example of a protocol stack of Bluetooth low energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

- The link manager layer 16 may perform ACL/SCO logical transport, logical link setup, and control
- Detach: The link manager layer 16 stops connection and informs a counterpart device about the reason for stopping connection.
- The link manager layer 16 performs power control and role switch.
- The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

☐ Request and Response message: A request message is a message for a client device to request specific information from a server device, and the response message, as a response message with respect to the request message, refers to a message transmitted from the server device to the client device.

☐ Command message: It is a message transmitted from the client device to the server device in order to indicate a command of a specific operation. The server device does not transmit a response with respect to the command message to the client device.

☐ Notification message: It is a message transmitted from the server device to the client device in order to notify an event, or the like. The client device does not transmit a confirmation message with respect to the notification message to the server device.

☐ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

☐ Service: It defines a basic operation of a device by a combination of behaviors related to data
☐ Include: It defines a relationship between services
☐ Characteristics: It is a data value used in a server
☐ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

☐Battery: Battery information exchanging method
☐Time: Time information exchanging method
☐FindMe: Provision of alarm service according to distance
☐Proximity: Battery information exchanging method
⑤Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ_PDU to the advertising device or when the advertising device receives a CONNECT_REQ_PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |

TABLE 1-continued

| PDU Type | Packet Name |
|---|---|
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute

Type: Type of attribute

Value: Value of attribute

Permission: Right to access attribute

A public device, such as a printer in a public place, has a policy for authentication for the purpose of authentication. If the public device is connected by an administrator and a user, an existing Bluetooth network uses the same authentication policy regardless of the administrator and the user.

Since the administrator and the user use the same policy, there may be inconvenience because the administrator provides a common user with a device use authority without limit and there is a problem in that common users may randomly change device configurations because all of access accounts have the same authority as the administrator. Furthermore, a defect may occur in a device and there may be a difficulty in the management of the device because many users use the device without limit.

In order to solve such a problem, an embodiment of the present invention proposes a method for dividing and generating an ID account used without limit in a conventional technology into an administrator (hereinafter referred to as an "Admin") account and a guest account.

By dividing an ID account into an Admin account and a guest account, common users can use only a required function of a public device limitedly. Accordingly, user convenience can be improved because a common user can perform authentication along with a public device through a simplified procedure, and a danger of a device defect and security can be solved because an administrator does not need to provide all of authorities for the device to a common user.

Hereinafter, a user authentication method for a user information exchange between a client device and a server device is described.

The user authentication method (or a user authentication service) may be performed according to the following three procedures.

a registration session: a process of registering a client device with a server device a secure session: a process of confirming whether a user is a previously registered user and generating a secure session a secure get/put operation: an operation for adding/deleting/updating user information (or token) stored in a server device A registration session characteristic is used by a client device in order to register a user. A registration session is required for each user of the client device. A server device issues a registration ID to the client device through the registration session. Thereafter, all of token access and authentication operations regarding a corresponding user are performed based on the registration ID.

Once the registration ID is registered, a server stores the registered registration ID in nonvolatile store. A connection release or reliability loss event between the client and the server may generate a token invalid for the server, but the registration of the client remains intact. For this reason, the user does not need to be registered to the server several times.

FIG. 6 is a diagram showing an example of a method for authenticating a guest of a public device to which an embodiment of the present invention may be applied.

Referring to FIG. 6, it is assumed that a user uses a public device in a coffee shop (e.g., Starbucks) and a fitness club.

A connection using Bluetooth communication may be performed according two authentication policies. Authentication may be performed using each of a UAS policy and a UAS guest policy.

A membership account may be registered by the UAS policy, and a guest account may be registered by the UAS guest policy.

That is, the membership account and the guest account may be registered to different policy domains, and thus authorities assigned thereto may be different.

For example, a limited authority may be set for a guest registered to the UAS guest policy domain so that the guest is allowed to use a running machine "Treadmill" in the fitness club once a day and to use a printer in the coffee shop with respect to only black-and-white printing.

In contrast, an authority may be set for a member registered to the UAS policy domain so that the member is allowed to use the running machine of the fitness club without limit and to use the printer of the coffee shop for color printing, a facsimile, etc. in addition to black-and-white printing.

A membership authentication method is described in brief below. A user device receives information (e.g., a fingerprint or the iris) about a user and generates a token. Thereafter, the token information is registered to the UAS policy domain or the UAS guest policy domain.

For example, when a membership user uses a printer, the UAS policy domain may manage the user. When the user uses a running machine, the UAS guest policy domain may manage the user.

That is, in the case of a membership, a generated token is information by which a user can be identified. The token may be registered to the UAS policy domain or the UAS guest policy domain.

A guest authentication method is described in brief below. A user device receives temporarily generated guest ID information and generates a token. Thereafter, the token information is registered to the UAS guest policy domain.

For example, if a guest user tries to use a printer or running machine using a guest ID written in a receipt, the user may be managed by only the UAS guest policy domain.

That is, in the case of a guest, a token generated based on a guest ID may be registered to only the UAS guest policy domain because the token does not identify the guest.

FIG. 7 is a diagram showing an example of a method for authenticating a guest of a public device to which an embodiment of the present invention may be applied.

Referring to FIG. 7, a public device may have various functions. In this case, a guest policy manager or an Admin policy manager may differently set use authorities for the various functions using different policies.

The public device may be a running machine, a printer, signage or an air conditioner in a fitness center, for example.

For example, the signage may have a function, such as a volume control function or a brightness control function.

In this case, after guest tokens are generated, a guest 1 and a guest 2 may be registered by the guest policy manager and assigned respective guest IDs. In this case, the guest policy manager may set the guest 1 and the guest 2 so that they use only the volume control function of the signage.

Furthermore, after a token is generated, an Admin (or manager) may be registered by the Admin policy manager and assigned an Admin ID. In this case, the Admin policy manager may set the Admin so that it can use all the functions of the signage.

FIG. 8 is a diagram illustrating the data format of the attribute protocol to which an embodiment of the present invention may be applied.

As described above, the attribute protocol may have 6 message types. The 6 message types may be indicated in the "Method" field of the ATT PDU.

A "Command Flag" field may be used to indicate whether data is a command message or not. As described above, if data is a command message, a server device does not send a response to a client device.

An "Authentication Signature Flag" field indicates whether an authentication signature is attached to the PDU or not.

An "Authentication Signature" field is optionally used, and provides Opcode and the signature of the attribute parameter field.

FIG. 9 is an embodiment to which the present invention may be applied and is a diagram showing a method for authenticating, by a public device, a device.

First, an authentication procedure between a public device and an Admin device is described.

The public device in an advertising state periodically sends an advertising event, and the Admin device in a scanning state receives the advertising event (S901).

The public device that has sent the advertising event to the Admin device and the Admin device that has received the advertising event enter ready mode.

The public device and the Admin device in ready mode perform Admin authentication (S902).

An Admin authentication procedure is described in detail later.

An authentication procedure between the public device and a guest device is described below.

The public device in the advertising state periodically sends an advertising event, and the guest device in the scanning state receives the advertising event (S903).

The public device that has sent the advertising event to the Admin device and the guest device that has received the advertising event enter ready mode.

The public device and the guest device in ready mode perform guest authentication (S904).

A guest authentication procedure is described in detail later.

FIG. 10 is an embodiment to which the present invention may be applied and is a diagram showing an Admin authentication method.

Referring to FIG. 10, a second device (or Admin device) in Admin mode may be connected to a first device (or public device) through an Admin authentication procedure. The Admin authentication procedure may be performed when the first device and the second device first attempt a connection.

The first device sends a user information request message to the second device in order to perform authentication between the devices (S1001).

That is, the first device may identify a user of the second device and perform Admin authentication or guest authentication.

In this case, the first device may send the user information request message using an ATT protocol.

The second device sends a user information response message for the user information request message to the first device (S1002).

In this case, the user information response message includes information about the user of the second device.

In this case, the second device may store the information (e.g., a fingerprint, a pattern and/or a password) of the user as a token value, and may send the user information response message, including the token value, to the first device. In this case, the token may mean a parameter indicated using a number, text, etc. by which the information of the user may be recognized by a device.

Furthermore, for example, the user information may be input to the second device using the fingerprint, iris, password and/or pattern of the user.

The first device that has received the user information recognizes that the user is an administrator and registers the second device with an Admin authority policy (or second authority policy) (S1003).

In other words, when recognizing that the user of the second device is an administrator, the first device may generate an Admin ID for the second device and register the generated Admin ID and the second device with the Admin authority policy.

The Admin authority policy (or second authority policy) indicates a control authority capable of controlling all of the operations of the first device, and may also be called an Admin domain, an Admin authority domain or an Admin authority policy domain.

The first device sends a notification message, indicating that the authentication procedure has been completed, to the second device (S1004).

That is, after generating the Admin ID using the information of the user, the first device may send a message for notifying the second device that the second device has been authenticated to the second device.

The message may include information about available services depending on an Admin ID and an Admin authority policy.

Step S1004 is optional and may be omitted, if necessary.

When the Admin authentication procedure is completed, a Bluetooth connection may be established between the first device and the second device registered to the Admin authority policy.

FIG. 11 is an embodiment to which the present invention may be applied and is a diagram showing a guest authentication method.

Referring to FIG. 11, a second device (or guest device) in guest mode may be connected to a first device (or public device) through a guest authentication procedure. The guest authentication procedure may be performed when the public device and the second device first attempt a connection.

The first device sends a user information request message to the second device in order to perform authentication between the devices (S1101).

That is, the first device may identify a user of the second device and perform Admin authentication or guest authentication.

In this case, the first device may send a user information request message to the second device using an ATT protocol.

The second device sends a response to the user information request message to the first device (S1102).

In this case, the user information response message includes information about a user of the second device.

In this case, the second device may store the information (e.g., a fingerprint, a pattern and/or a password) of the user as a token value, and may send the user information response message, including the token value, to the first device.

Furthermore, for example, the user information may be input to the second device using the fingerprint, iris, password and/or pattern of the user.

The first device that has received the user information recognizes that the user is a guest and registers the second device with a guest authority policy (or first authority policy) (S1103).

In other words, when recognizing that the user of the second device is a guest, the first device may generate a guest ID for the second device and register the generated guest ID and the second device with the guest authority policy.

The guest authority policy (or first authority policy) indicates a control authority capable of controlling the operation of the first device within a limited range, and may also be called a guest domain, a guest authority domain or a guest authority policy domain.

The first device sends a notification message, providing notification that the authentication procedure has been completed, to the second device (S1104).

That is, after generating the guest ID using the information of the user, the first device may send a message or checking whether the second device has been authenticated.

The message may include information about available services depending on a guest ID and a guest authority policy.

An authentication procedure performed when a public device and a user device (or an Admin device or guest device) first attempt a connection has been described above. A procedure performed for a connection between a public device and a user device having a history of being connected before through an authentication procedure is described below.

First, a user identity check procedure is described. The user identity check procedure is a procedure for confirming registered user information. The user identity check procedure may be performed when a user connects a device having a history of being connected to a public device before to the public device using his or her information (e.g., a fingerprint, the iris, a pattern and/or a password). The public device may identify the user of the device who attempts the connection through registered/stored user information through the user identity check procedure.

FIG. 12 is an embodiment to which the present invention may be applied and is a diagram showing a method for connecting to a previously registered user device.

A public device sends a user information request message to a user device (S1201).

That is, the public device (or first device) requests user information from the user device in order to connect with the user device (or second device).

The user device receives the user information (S1202).

In this case, the user device may receive the user information from a user using a fingerprint, a password, the iris, a pattern, etc. Furthermore, the user device may generate a token value using the user information or fetch a token value stored in token store.

The user device sends a user information response message as a response to the user information request message (S1203).

The user information response message may include a token ID of the user. Alternatively, the user information response message may include an Admin ID if the user device has been subjected to Admin authentication, and may include a guest ID if the user device has been subjected to guest authentication.

The public device recognizes the user information, registered to the public device, based on the received user information response message (S1204).

The public device may recognize whether the user device is a registered user device or not and the authority of the user device by comparing the token ID (or Admin ID or guest ID), included in the user information response message, with an ID registered to the public device.

In other words, the first device may confirm whether the second device is a previously registered device.

If the second device corresponds to a device previously registered as an Admin account or guest account through an authentication procedure, the public device may terminate the user identity check procedure and enter a connection state with the user device.

If an Admin device or a guest device has never performed an authentication procedure before, a connection between devices may be established by sending only a token ID (or Admin ID or guest ID). Accordingly, the time taken for a connection can be significantly reduced and user convenience can be improved.

The authority of a user device may be changed even after it performs an authentication procedure along with a public device. This is called a change authority procedure.

For example, the authority of a device that has performed Admin authentication may be changed from an Admin account to a guest account through a change authority procedure. Likewise, the authority of a device that has performed guest authentication may be changed from a guest account to an Admin account.

Furthermore, for example, a guest account or an Admin account is maintained, but an authority or available service set for each account may be changed through a change authority procedure.

The change authority procedure is described below with reference to FIG. 13.

FIG. 13 is an embodiment to which the present invention may be applied and is a diagram showing a method for changing the authority of a previously registered user device.

A public device sends a user information request message to a user device (S1301).

That is, the public device (or first device) requests user information from the user device in order to connect with the user device (or second device).

The user device receives the user information (S1302).

In this case, the user device may receive the user information from a user using a fingerprint, a password, the iris, a pattern, etc. Furthermore, the user device may generate a token value using the user information or fetch the token value stored in token store.

The user device sends a user information response message as a response to the user information request message (S1303).

The user information response message may include the token ID of the user. Alternatively, the user information response message may include an Admin ID if the user device has been subjected to Admin authentication, and may include a guest ID if the user device has been subjected to guest authentication.

The public device recognizes user information registered to the public device based on the received user information response message (S1304).

The public device may recognize whether the user device is a registered user device and the authority of the user device by comparing the token ID (or Admin ID or guest ID), included in the user information response message, with an ID registered to the public device.

The public device sends a change authority request message to the user device (S1305).

The change authority request message may include a field indicative of a change to a guest account, a change to an Admin account, a change in an authority set in the authentication process and so on.

The user device sends a change authority response message to the public device as a response to the change authority request message (S1306).

When the user device sends the change authority response message to the public device, the change authority procedure is terminated, and the public device and the user device enter a connected state.

Furthermore, step S1306 may be omitted. That is, when the public device sends a notification message, notifying the user device that the authority has been changed, to the user device, the change authority procedure may be terminated without a response message from the user device.

If the user information (i.e., token ID, Admin ID or guest ID) has been deleted or if the authority of the user device has been deleted, the public device may notify the user device that the user information or the authority has been deleted and may perform an authentication procedure again along with the user device.

For example, the user information may be deleted for a reason, such as if the user device has not been used for a long time, if the user has left a membership, if existing information has been deleted, or if a set deadline has been excessively overdue. In this case, after sending a notification message to the user device, the public device may perform an authentication procedure along with the user device. This is described below with reference to FIG. 14.

FIG. 14 is an embodiment to which the present invention may be applied and is a diagram showing a method for connecting to a previously registered user device.

A public device sends a user information request message to a user device (S1401).

That is, the public device (or first device) ≒ the user device (or second device) requests user information from the user device in order to connect with the user device.

The user device receives the user information (S1402).

In this case, the user device may receive the user information from a user using a fingerprint, a password, the iris, a pattern, etc. Furthermore, the user device may generate a token value using the user information or fetch the token value stored in token store.

The user device sends a user information response message to the public device as a response to the user information request message (S1403).

The user information response message may include the token ID of the user. Alternatively, the user information response message may include an Admin ID if the user device has been subjected to Admin authentication, and may include a guest ID if the user device has been subjected to guest authentication.

If the user information has been deleted, the public device sends a message, notifying the user device that the user information has been deleted, to the user device (S1404).

If the authority of the user device has been deleted, the public device may send a message, notifying the user device that the authority has been deleted, to the user device.

The message is a notification message and may not request a response from the user device.

A procedure for the deletion and notification of user information/authority is terminated through step S1404. An authentication procedure may be performed in order to establish a connection between the public device and the user device.

The authentication procedure between the public device and the user device may be performed in accordance with the authentication method described with reference to FIGS. 9 to 11. Furthermore, in the authentication procedure, authentication for the user device may be performed using the user information received at step S1403.

In a process of connecting devices, if user information is transmitted and received, there is a danger that the user information may be exposed to a crime due to the leak of user personal information. A method for establishing a connection between devices using virtual user information is described below with reference to FIG. 15.

FIG. 15 is an embodiment to which the present invention may be applied and is a diagram showing a method for establishing a connection between devices using virtual user information.

A public device sends a user information request message to a user device (S1501).

That is, the public device (or first device) requests user information from the user device in order to connect with the user device (or second device).

The user device receives the user information (S1502).

In this case, the user device may receive the user information from a user using a fingerprint, a password, the iris, a pattern, etc. Furthermore, the user device may generate a token value using the user information or fetch the token value stored in token store.

The user device in virtual mode generates virtual user information using the user information (S1503).

The user may previously set the user device in virtual mode for a secure connection between devices.

The user device in virtual mode may generate the virtual user information by encrypting the user information. In this case, the generated virtual user information may be stored as a token value.

The user device sends a user information response message as a response to the user information request message (S1504).

The user information response message may include the virtual user information and a token ID. Alternatively, the user information response message may include an Admin ID if the user device has been subjected to Admin authentication, and may include a guest ID if the user device has been subjected to guest authentication.

The public device recognizes user information registered to the public device based on the received user information response message (S1505).

The public device decodes the virtual user information included in the received user information response message, and compares the decoded virtual user information with the registered user information.

That is, the public device may recognize whether the user device is a registered user device and the authority of the user device by comparing the token ID (or Admin ID or guest ID), included in the user information response message, with an ID registered to the public device.

If the user device corresponds to a device previously registered as an Admin account or guest account through an authentication procedure, the public device may terminate a user identity check procedure using the virtual user information and enter a connected state with the user device.

The flowchart described above is only illustrative, and some of the steps in the flowchart may be omitted and a step that has not been illustrated in the flowchart may be added.

A user case to which the method proposed by this specification may be applied is described below.

FIG. 16 is an embodiment to which the present invention may be applied and is a diagram showing a method for establishing a Bluetooth connection with a public device through an authentication procedure.

A user may use a public device, such as a printer, in a coffee shop, for example, Starbucks. That is, the user may establish a connection with the public device for Bluetooth wireless communication using a user device, and may use the public device.

Referring to FIG. 16, a user may connect to a printer, that is, a public device disposed at Starbucks, using a smart phone, that is, a user device, at Starbucks. The user may perform a guest authentication procedure according to the following procedure.

1. The user receives a receipt paid for a beverage in the coffee shop and checks a print access ID for a guest which has been written in the receipt.

2. The user enters the print access ID on an application managed by the coffee shop and performs a guest authentication procedure between the smart phone and the printer. In this case, guest authentication between the smart phone and the printer may be performed according to the method described with reference to FIG. 11.

3. When the guest authentication procedure is completed, a Bluetooth connection is established between the smart phone and the printer, and the smart phone in guest mode may use a function of the printer. For example, the user may output a document, stored in the smart phone, using the printer.

As described above, if there is a history in which the smart phone and the printer had been connected before through the guest authentication procedure, the user may be connected to the public device through a user identity check procedure without the intervention of the authentication procedure. In this case, the user may be connected to the public device according to the following procedure.

1. After executing an application managed by the coffee shop on the smart phone, the user performs login using a fingerprint, a password, etc. on the application.

2. The smart phone of the user may be immediately connected to the printer after the login because it has been registered to the printer disposed in the coffee shop through guest authentication. In this case, a Bluetooth connection between the devices may be established through a user identity check procedure according to the method described with reference to FIG. 12. Thereafter, the user may output a document, stored in the smart phone, using the printer.

FIG. 17 is an embodiment to which the present invention may be applied and is a diagram showing a method for changing the authority of a previously registered user device.

Referring to FIG. 17, when a user changes into an administrator, a user device may change from a guest account into an Admin account through a change authority procedure. The authority of the user device may be changed according to the following procedure.

1. After registering a smart phone with TV in a public place as a guest account, the user uses a function, such as the volume control or channel change function of the TV.

2. After confirming user information, the TV requests a change of the authority from the smart phone. For example, when the user manages the public place or uses a charged service for a facility in the public place, the TV may request a change of the authority from the user based on changed user information. In this case, a change authority procedure may be applied in accordance with the method described with reference to FIG. 13.

3. When the user accepts the change authority request on the smart phone, the smart phone may change from a guest account to an Admin account. In this case, the user may control all of the functions of the TV and change configurations using the smart phone.

FIG. 18 is an embodiment to which the present invention may be applied and is a diagram showing a method for recovering the authority of a previously registered user device.

Referring to FIG. 18, an example in which a first user receives information for guest authentication from a second user and the authority of the first user is recovered after a lapse of a specific period is described below. An authority recovery procedure may be performed according to the following procedure.

1. The first user User#1 requests an electronic key which may be used to unlock an entrance doorlock on which Bluetooth has been mounted from the second user User#2. In this case, the second user may send the electronic key to the smart phone of the first user using the smart phone of the second user. Furthermore, in order to maintain security, the electronic key may be encrypted in a virtual information form and transmitted.

2. The first user may be connected to the doorlock, installed on the entrance, through a guest authentication procedure using the electronic key received from the first user, and may release the locking of the doorlock.

3. The electronic key transmitted to the first user is an electronic key temporarily generated for a guest. After a lapse of a specific time, the guest account of the smart phone of the first user may be deleted from the doorlock. Thereafter, if the first user tries to release the locking state of the doorlock, he or she has to perform an authentication procedure again.

The present invention is not limited and applied to the configurations and methods of the aforementioned embodiments, but some or all of the embodiments may be selectively combined and configured so that the embodiments are modified in various ways.

Furthermore, the present invention described above may be substituted, modified or changed by a person having ordinary skill in the art to which the present invention pertains without departing from the technological spirit of the present invention, and thus is not restricted by the aforementioned embodiments and the accompanying drawings.

This specification relates to a method for connecting devices and, more particularly, to a method and apparatus for establishing a connection between devices using a Bluetooth low energy (BLE) technology.

In accordance with an embodiment of the present invention, when a user is connected through an Admin authentication procedure, he or she can manage a device and change configurations as an administrator, and can use all of the functions of the device.

Furthermore, in accordance with an embodiment of the present invention, a device connected/used by a user can be efficiently managed and a danger of a device defect and security can be solved because the user is connected through a guest authentication procedure.

Furthermore, in accordance with an embodiment of the present invention, user convenience can be improved because authenticated devices can be connected through a simplified procedure.

Furthermore, in accordance with an embodiment of the present invention, the leak of personal information can be prevented because virtual user information is generated and a connection between devices is performed using the virtual user information.

Advantages which may be obtained by the present invention are not limited to the aforementioned advantages, and various other advantages may be evidently understood by those skilled in the art to which the present invention pertains from the following description.

What is claimed is:

1. A method for connecting, by a first device, with a second device using Bluetooth communication, the method comprising:
    transmitting a request message to request user information for identifying a user of the second device to the second device;
    receiving a response message including the user information from the second device;
    registering the second device to a first authority policy or a second authority policy based on the user information;
    establishing a Bluetooth connection with the second device registered to the first authority policy or the second authority policy;
    transmitting a change request message for changing an authority policy to which the second device has been registered to the second device;
    receiving a change response message indicating an approval of the change in response to the change request message from the second device; and
    changing the authority policy to which the second device has been registered,
    wherein the first authority policy indicates a first control authority for controlling an operation of the first device,
    wherein the second authority policy indicates a second control authority for controlling an operation of the first device,
    wherein the first control authority indicates a control authority capable of controlling an operation of the first device within a limited range, and
    wherein the second control authority indicates a control authority capable of controlling all of operations of the first device.

2. The method of claim 1, further comprising transmitting a notification message including an identifier (ID) indicating that the second device has been registered to the first authority policy or the second authority policy and service information indicating services available for the second device according to the registered authority policy.

3. The method of claim 1, wherein the user information is input to the second device using at least one of a fingerprint, iris, password, and pattern of the user.

4. The method of claim 1, wherein the response message includes a token value indicative of the user.

5. The method of claim 1, wherein the user information included in the response message is encrypted virtual user information.

6. The method of claim 1, wherein the registering the second device comprises:
    checking whether the second device is a previously registered device; and
    registering the second device to the first authority policy or the second authority policy when the second device is not a previously registered device.

7. The method of claim 1, further comprising transmitting a notification message indicating that information about the second device has been deleted when the second device information registered to the first authority policy or the second authority policy has been deleted.

8. The method of claim 1, wherein the changing the authority policy comprises:
   registering the second device to the second authority policy when the second device has been registered to the first authority policy.

9. The method of claim 1, wherein the changing the authority policy comprises:
   registering the second device to the first authority policy when the second device has been registered to the second authority policy.

10. A first device for connecting with a second device using Bluetooth communication, the first device comprising:
   a communication unit; and
   a processor functionally connected to the communication unit,
   wherein the processor is configured to:
      control the communication unit to transmit a request message to request user information for identifying a user of the second device to the second device,
      control the communication unit to receive a response message including the user information from the second device,
      register the second device to a first authority policy or a second authority policy based on the user information,
      establish a Bluetooth connection with the second device registered to the first authority policy or the second authority policy,
      control the communication unit to transmit a change request message for changing an authority policy to which the second device has been registered to the second device,
      control the communication unit to receive a change response message indicating an approval of the change as a response to the change request message from the second device, and
      change the authority policy to which the second device has been registered,
   wherein the first authority policy indicates a first control authority for controlling an operation of the first device,
   wherein the second authority policy indicates a second control authority for controlling an operation of the first device,
   wherein the first control authority indicates a control authority capable of controlling an operation of the first device within a limited range, and
   wherein the second control authority indicates a control authority capable of controlling all of operations of the first device.

* * * * *